United States Patent
Marriott et al.

(10) Patent No.: US 6,676,195 B1
(45) Date of Patent: Jan. 13, 2004

(54) SELF-SEALING DOOR WATER SHIELD BARRIER

(75) Inventors: Donald P. Marriott, Rochester Hills, MI (US); Steve Hummel, Ortonville, MI (US)

(73) Assignee: Creative Foam Corp., Fenton, MI (US)

( * ) Notice: Subject to any disclaimer, the term of this patent is extended or adjusted under 35 U.S.C. 154(b) by 0 days.

(21) Appl. No.: 10/295,447

(22) Filed: Nov. 15, 2002

(51) Int. Cl.⁷ .............................. B60R 13/02; B60J 5/04
(52) U.S. Cl. ................. 296/146.7; 296/146.1; 296/39.1
(58) Field of Search ............... 296/146.1, 146.5, 296/146.7, 39.1; 49/502

(56) References Cited

U.S. PATENT DOCUMENTS

| | | |
|---|---|---|
| 2,095,776 A | 10/1937 | Von Hofe et al. |
| 2,111,168 A | 3/1938 | Chansor |
| 2,824,920 A | 2/1958 | Humphreys |
| 2,829,728 A | 4/1958 | Brown |
| 3,684,642 A | 8/1972 | Rogers, Jr. |
| 3,770,556 A | 11/1973 | Evans et al. |
| 3,778,101 A * | 12/1973 | Tsuda ................. 49/502 |
| 4,090,582 A | 5/1978 | Deschu |
| 4,161,995 A | 7/1979 | Pohlmann et al. |
| 4,201,612 A | 5/1980 | Figge et al. |
| 4,420,520 A | 12/1983 | Jones et al. |
| 4,469,732 A | 9/1984 | Isaksen et al. |
| 4,533,577 A | 8/1985 | Mier |
| 4,544,593 A | 10/1985 | Borgert et al. |
| 4,588,627 A | 5/1986 | Isaksen et al. |
| 4,604,302 A | 8/1986 | Isaksen et al. |
| 4,696,848 A | 9/1987 | Jones et al. |
| 4,803,777 A | 2/1989 | Nakagawa et al. |
| 4,848,829 A | 7/1989 | Kidd |
| 4,865,791 A | 9/1989 | Ferro |
| 4,873,132 A | 10/1989 | Jones et al. |
| 4,957,803 A | 9/1990 | Foley |
| 5,039,172 A | 8/1991 | Krieger |
| 5,090,762 A | 2/1992 | Krieger |
| 5,322,722 A | 6/1994 | Rozenberg |
| 5,345,720 A * | 9/1994 | Illlbruck et al. ......... 49/502 |
| 5,409,779 A | 4/1995 | Puckett et al. |
| 5,456,513 A * | 10/1995 | Schmidt .............. 296/39.1 |
| 5,462,482 A | 10/1995 | Grimes |
| 5,482,343 A * | 1/1996 | Bradac ................ 296/39.1 |
| 5,560,967 A | 10/1996 | Isaksen |
| 5,584,144 A | 12/1996 | Hisano |

(List continued on next page.)

FOREIGN PATENT DOCUMENTS

| | | |
|---|---|---|
| US | 2001/0030444 | 10/2001 |
| US | 2002/0027376 | 3/2002 |

*Primary Examiner*—Joseph D. Pape
*Assistant Examiner*—Greg Blankenship
(74) *Attorney, Agent, or Firm*—Young & Basile, PC (57) ABSTRACT

An apparatus and method for manufacturing a vehicle door barrier or shield for attachment to an inner door trim panel mountable on a vehicle door in which the barrier self-seals the opening between the vehicle door and the interior passenger compartment. The barrier is formed of a resilient gasket material that is shaped or formed with a peripheral rail or spring attachment surface that is compressed as the interior vehicle door trim panel is fastened to the interior surface of the door sheet metal to effect a watertight seal about the periphery of the door. The attachment surface carrying a seal material is disposed in an interference position with the door inner panel when the joined inner door trim panel and the barrier are mounted on the door inner panel. The interference deflects the attachment surface to create a joining force to secure the seal material to the door inner panel. The attachment surface may be a continuous shaped section of the barrier and/or a cantilevered edge portion of varying cross section.

34 Claims, 5 Drawing Sheets

U.S. PATENT DOCUMENTS

| | | |
|---|---|---|
| 5,688,015 A | 11/1997 | Patterson et al. |
| 6,045,921 A | 4/2000 | Restaino et al. |
| 6,076,882 A | 6/2000 | Szerdahelyi et al. |
| 6,139,088 A * | 10/2000 | Okamoto et al. ........ 296/146.6 |
| 6,142,556 A | 11/2000 | Tanaka et al. |
| 6,158,789 A | 12/2000 | Fett et al. |
| 6,186,579 B1 * | 2/2001 | Fussnegger et al. ..... 296/146.1 |
| 6,197,403 B1 | 3/2001 | Brown et al. |
| 6,226,927 B1 * | 5/2001 | Bertolini et al. .............. 49/502 |
| 6,348,169 B1 | 2/2002 | Stipes et al. |
| 6,381,906 B1 * | 5/2002 | Pacella et al. ........... 296/146.7 |
| 6,409,250 B1 * | 6/2002 | Schultheiss .............. 296/146.7 |
| 6,412,852 B1 * | 7/2002 | Koa et al. ................. 296/146.7 |
| 6,428,081 B1 * | 8/2002 | Williams, Jr. et al. ... 296/146.7 |
| 6,447,047 B1 * | 9/2002 | Marcovecchio et al. . 296/146.7 |
| 6,449,907 B2 * | 9/2002 | Nishikawa et al. ...... 296/146.7 |

* cited by examiner

SELF-SEALING DOOR WATER SHIELD BARRIER

BACKGROUND

The present invention is related to vehicle door water shield barriers, which prevent the ingress of water, sound, dirt and air into the vehicle passenger compartment.

It is known that a door water shield provides a water, sound, dirt and air barrier between the inner door trim panel and the inner metal panel of a vehicle door. Water shield barriers are made of a broad range of materials including stamped sheet metal, injection molded rigid plastic, resilient foamed and non-foamed plastics. The barriers also may be combined with other acoustic materials to provide sound attenuation in the vehicle passenger compartment.

Although the current state of the art production of the door water shield varies from one manufacturer to another, typically all manufacturers use a flat or formed sheet of resilient material with a peripheral band of adhesive or foam gasket designed to seal the water shield barrier material to the inner sheet metal of a vehicle door. An assembly line worker mounts the water shield on the door inner surface. The adhesive is then pressed onto the surface manually using a hand and/or by use of a wiping device to insure that the adhesive is bonded to the door sheet metal. In some applications, a mechanical pressurized roller system is used to firmly press the adhesive into place. In other applications, the assembly line worker may apply adhesive from a dispenser directly to the vehicle door, and then proceed as above to apply the water shield barrier to the adhesive and pressing the two together.

An alternate assembly is known where the water shield barrier is essentially a flat sheet bonded to resilient sound absorbing material such as nonwoven fiber pads, initially attached to the interior side of a trim panel, and then the entire assembly is mounted to the trim panel. This method depends on consistent thickness, density and compressive resiliency of the nonwoven fiber pad to exert the proper force to self-seal the water shield to the door sheet metal.

Care must be taken during the shipping of the water shield to the vehicle assembly plant. The adhesive must be protected from adjacent surfaces so that errant sticking to the wrong surfaces is prevented. Most materials have a side that has a release coating to which the adhesive will not stick and a bond side to which the adhesive is applied. These parts can then be stacked together on top of each other in a shipping container without the need for an additional release liner. A thin sheet of a release liner may also be used to cover the adhesive during shipping. The release liner is removed just prior to assembly of the water shield on the metal door inner panel.

There is a constant need to improve vehicle assembly efficiency. This has led to the trend toward modularity in which more and more vehicle components are assembled into sub-assemblies, which are then installed in a vehicle as a single component. Thus, it would be desirable to improve the assembly of a door water shield to the vehicle door in a manner that improves assembly efficiency, and reduces assembly time, labor and cost.

SUMMARY

The present invention is an apparatus and method for attaching a modular vehicle door water shield, premounted on an inner door trim panel assembly, to an inner door panel in a single step. The inventive apparatus is a particular shape of the water shield, a particular selection of resilient base sheet, and a particular selection of an adhesive or foam in place gasket that causes the modular water shield and the door trim panel to effectively seal water, wind, noise and dust when installed as a modular unit.

Specifically, the present invention is a vehicle door water shield apparatus, which is mountable on an inner door trim panel and joinable along with the inner door trim panel to the inner panel of a vehicle door. The door water shield includes a formed attachment surface integral with the overall water shield barrier, which is disposed in an interference position with the door inner panel when the inner door trim panel and the water shield are mounted on the inner panel of the vehicle door. A seal material, such as a pressure sensitive adhesive or a foamed in place gasket, is carried on the formed attachment surface for sealing of the water shield to the vehicle inner door panel.

The formed attachment surface is molded into a specially shaped section at or near the periphery of the water shield, which is deflectable under interference engagement with the door inner panel. The attachment surface can be a three-sided or inverted U shape deflectable surface within the periphery of the water shield and/or a cantilevered end on the periphery of the water shield.

In one aspect of the invention, the apparatus includes an inner door trim panel attachable to a vehicle inner door panel. A door water shield is attached to the inner door trim panel. An attachment surface is carried on the water shield and disposed in an interference position with a vehicle door inner panel when the inner door trim panel and the water shield are mounted on the door inner panel. A seal material is carried on the attachment surface for sealing attachment of the water shield to the door inner panel.

Another aspect of the invention is a method of manufacturing a vehicle door formed of joined inner and outer sheet metal panels and an inner trim panel mounted on the inner door sheet metal panel. The method includes the steps of:

forming the door water shield with an attachment surface disposed in interference position with the door inner panel when the door water shield and inner door trim panel module is attached to the door inner painted sheet panel;

applying a seal material on the attachment surface;

attaching the door water shield to the inner door trim panel to form a module; and attaching the inner door trim panel and door water shield module to the door inner panel while simultaneously sealing the door water shield to the door inner panel through interference contact of the attachment surface of the door water shield with the door inner panel.

The present apparatus and method simplifies the assembly of vehicle doors by reducing assembly, labor time and associated cost due to the modular arrangement of the door water shield and inner door trim panel and the interference mounting of the adhesive on the attachment surface of the water shield on the door inner panel which automatically creates the pressing force necessary to securely seal the adhesive or gasket on the water shield to the door inner painted sheet metal panel at the same time the inner door trim panel itself is being attached to the door inner panel. This eliminates any separate mounting of the door water shield to the door inner panel as in previous vehicle door constructions.

BRIEF DESCRIPTION OF THE DRAWINGS

The various features, advantages and other uses of the present invention become more apparent by referring to the following detailed description and drawing in which.

DETAILED DESCRIPTION

Figure 1:
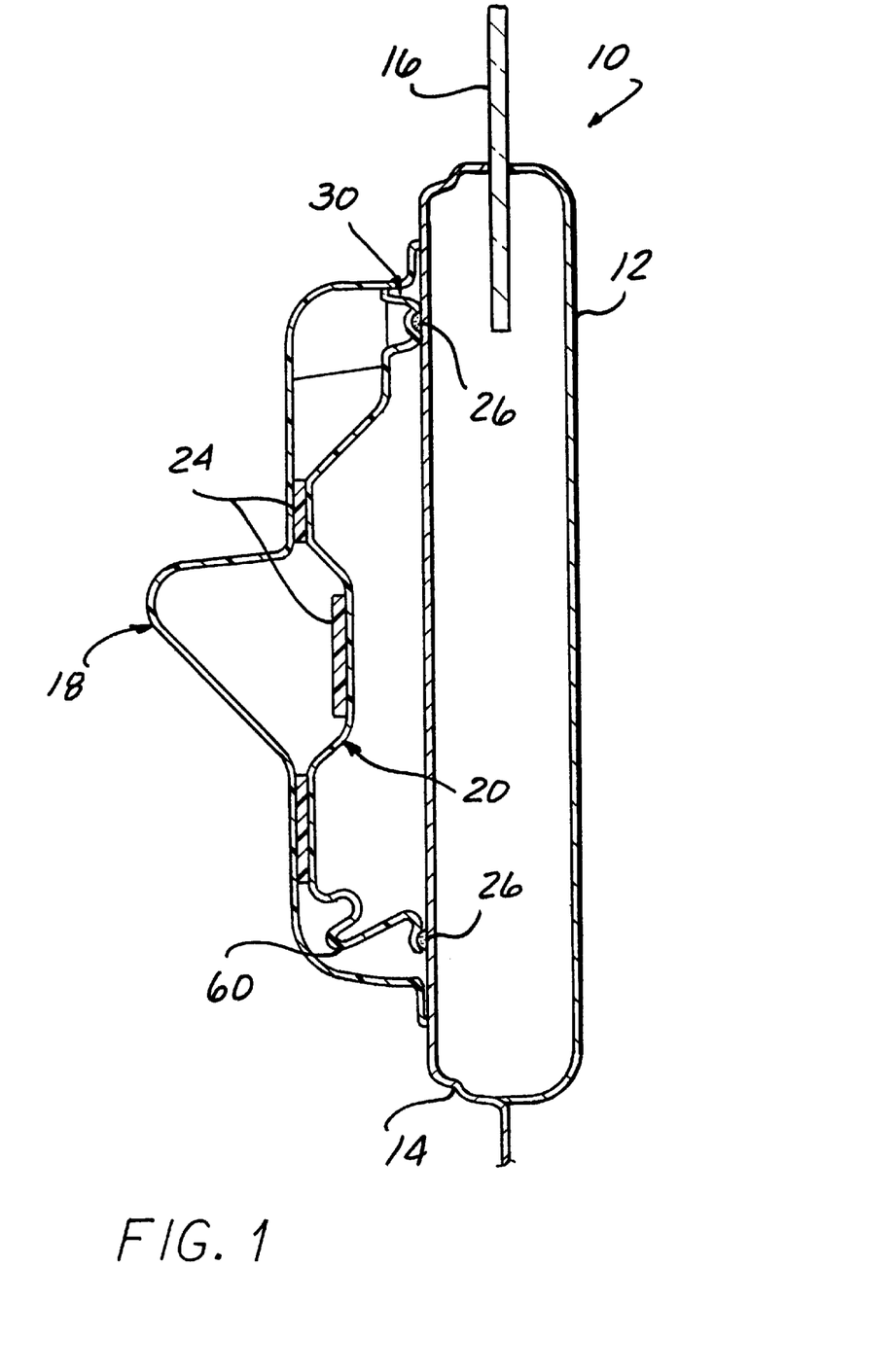
FIG. 1 is a cross sectional view of a vehicle door assembly incorporating a door water shield according to the present invention depicted in an assembled state.

Referring to FIG. 1, the typical construction of a vehicle door will be first be described by way of background to illustrate the advantageous use of the present invention.

A conventional vehicle door 10 includes an outer, typically sheet metal panel 12 which is joined at its peripheral edges to an inner, typically sheet metal panel 14. Central upper portions of the outer and inner panels 12 and 14 are spaced apart to define an opening to a hollow interior cavity formed between the spaced outer and inner panels 12 and 14. A glass window 16 is moveably mounted through the opening between the upper portions of the outer and inner panels 12 and 14 for movement into and out of the cavity between the outer and inner panels 12 and 14.

Although not shown in FIG. 1, conventional window regulator and door lock and/or mirror control elements are also mounted in the door cavity and connected to at least the lower portion of the window 16 and to door lock and mirror mechanisms, not shown, to control movements of the window, door locks and mirror in response to interior actuators usually mounted through an inner door trim panel 18. The inner door trim panel 18 is a three dimensional formed surface of various plastics, fabric or natural material combinations. The inner door trim panel 18 is mounted on the inner door panel 14 by means of hooks, fasteners or clips, not shown.

According to the present invention, a door water shield or barrier 20 shown in one aspect in FIG. 1, and in another aspect by reference number 22 in FIGS. 2–6, is mounted by means of friction fit, RF welding, clips, or other suitable fasteners, not shown, to the inner surface of the door inner trim panel 18. The door water shield 20 is formed of suitable elastomeric, resilient materials, including various polyolefins, such as, but not limited to, polyethylene and polypropylene, which are foamed or not foamed.

The door water shield 20 or 22 can be a flat sheet or formed with pockets, recesses and/or even apertures to accommodate various hardware and actuators mounted externally and internally of the vehicle door 10.

In addition, optional acoustic materials denoted by reference number 24 in FIG. 1 may be applied as a single sheet or in separate pieces to various portions of the door water shield 20 or 22, typically between the water shield 20 and the door inner trim panel 18 or between the water shield 20 and vehicle door panel, to provide acoustic features to dampen sounds from entering the passenger compartment of the vehicle through the door 10.

According to the present invention, the door water shield 20 or 22 is designed to be initially attached to the inner surface of the inner door trim panel 18 to create a single sub-assembly or module for unitary mounting of the resulting sub-assembly in a single step to the door inner panel 18.

In order to create the desired sealing characteristics for the water shield 10 with respect to the door inner panel 14 to prevent the entry of air, dust and water into the vehicle passenger compartment, a seal is created between the entire periphery or at least a substantial portion of the entire periphery of the door water shield 20 or 22 and the door inner panel 14. A seal material, such as an adhesive 26, is employed to create the seal. The adhesive 26 may provide a permanent bond or, more typically, a pressure sensitive adhesive is employed to bond the water shield to the inner door panel 14. The adhesive 26 is applied in a thin film or bead. Variations of beads, such as an extruded bead, swirl, spray or film coating or a foamed, nitrogen blown bead are also possible.

According to the present invention, the term "adhesive" will be understood to include any type of adhesive that provides the tack and bond strength regardless of the application method or adhesive configuration. Adhesive at the bonding surface will be understood to mean a material or treatment of a material that provides a seal when assembled, such as, but not limited to, cling foam and impregnated foams.

In the case of a foam in place gasket bead used as the seal material 26, a one part or a two part, mixed, foamed in situ bead or gasket is applied to the door inner trim panel 18 to securely attach the water shield 20 to the trim panel 18. At the same time, the foam in place gasket will allow removal and installation without damaging the water shield or creating bonding issues.

The use of a foam material as the seal material also makes use of the deflectable attachment surface as described herein to desirably minimize the attachment force levels necessary to securely seal the door water shield 20 to the vehicle door inner panel 14. However, in this aspect, the mechanical fasteners used to mount the door inner trim panel 18 to the door inner panel 14 will provide the necessary mounting force required to maintain the foam material in a sealed, compressed state between the door water shield 20 and the door inner panel 14.

Figure 2:
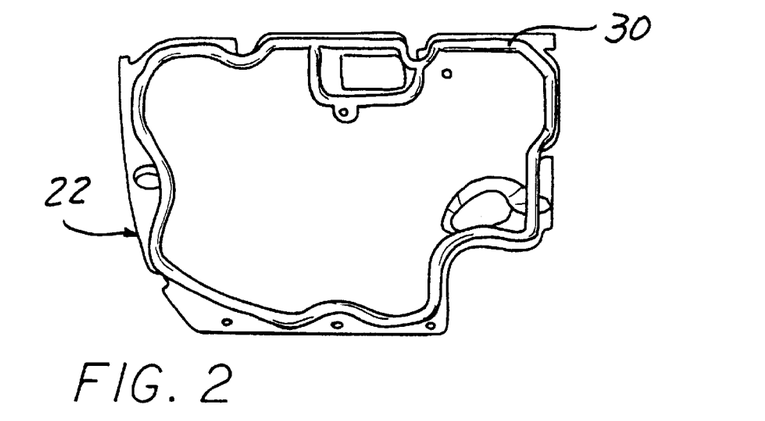
FIG. 2 is a plan elevational view of another example of a door water shield according to the present invention.
Figure 3:
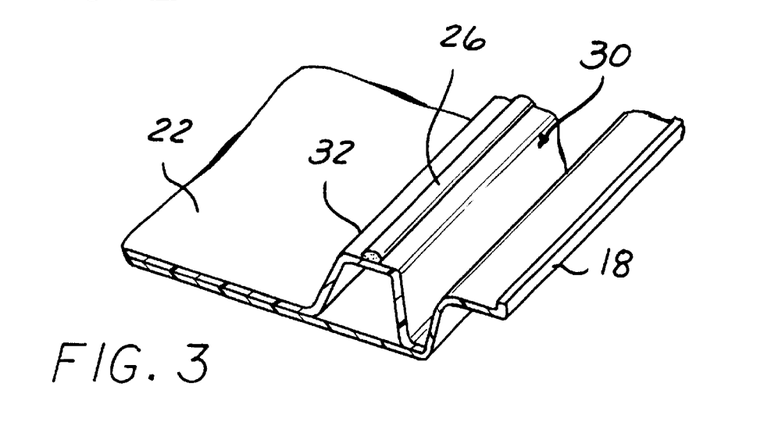
FIG. 3 is a partial, enlarged perspective view of the door water shield shown in FIG. 2.

As shown in FIG. 2 for the water shield 20, a raised, deflectable attachment surface 30 is provided in a continuous or substantially continuous manner with none, one or multiple discontinuities generally about the peripheral extent of the inner surface of the water shield 20. The outermost surface 32 of the raised surface 30 has a dimension or extent from the main plane of the water shield 22 so as to place the inner surface 32 and the adhesive bead 26 carried thereon in interference with a mating surface of the door inner panel 14.

Figure 4:
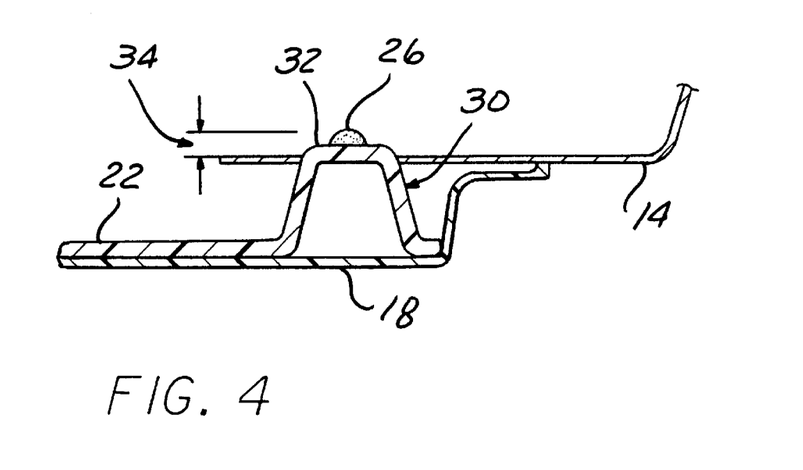
FIG. 4 is a cross sectional view showing the door water shield of FIGS. 2 and 3 in a static design pictorial representation of an assembled interference state.
Figure 5:
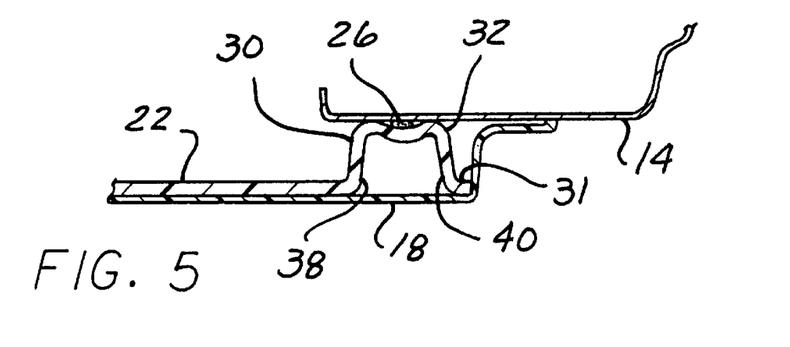
FIG. 5 is a cross sectional view, similar to FIG. 4, but showing the door water shield in its actual deflected state.

In aspect to the invention shown in FIGS. 2–5, the height of the raised surface 30 from the door inner trim panel 18 to the outermost surface 32 is greater than the distance or dimension between the door inner trim panel 18 and the inner surface of the door inner panel 14 when the inner door trim panel 18 is mounted in its nominal position on the door inner panel 14 as shown in FIG. 4. This interference dimension shown by reference 34 creates a force against the rigidity of the raised surface 30 during the attachment of the door inner trim panel 18 to the door inner panel 14 which deforms the surface 30 to a sufficient extent to generate a force high enough to forcibly seal the seal material 26 on the raised surface 30 to the door inner panel 14 at the same time the door inner trim panel 18 is being affixed to the door inner sheet metal panel 14. For the raised surface 30 which has a generally inverted U-shape with respect to the main extend of the water shield 22, the deformation occurs in the side walls 38 and 40 and in the end surface or end wall 32 as shown in FIG. 5. The deformation creates stresses in the raised surface 30, which generates the required attachment force to automatically forcibly seal the seal material 26 to the door inner panel 14 without the need for separate application pressure from an installer, machine, etc.

When an adhesive is used as the seal material 26, the deflection or deformation provides the required attachment force to forcibly adhere the adhesive material to the door inner panel 14 to effectively seal the door water shield 20 to the door inner panel 14. In the case of foam in place gasket used as the seal gasket material 26, the deformation or deflection provides the necessary force to effect a complete seal between the door water shield 20 and the door inner panel 14 by compression of the foam in place gasket.

Referring back to FIG. 2, it can be seen that the raised surface 30 extends continually above the periphery the door water shield 22. Thus, in this example, the entire raised surface 30 is deformed in the manner shown in FIG. 5, when the door inner panel 18 is attached to the inner sheet metal panel 14.

Figure 6:
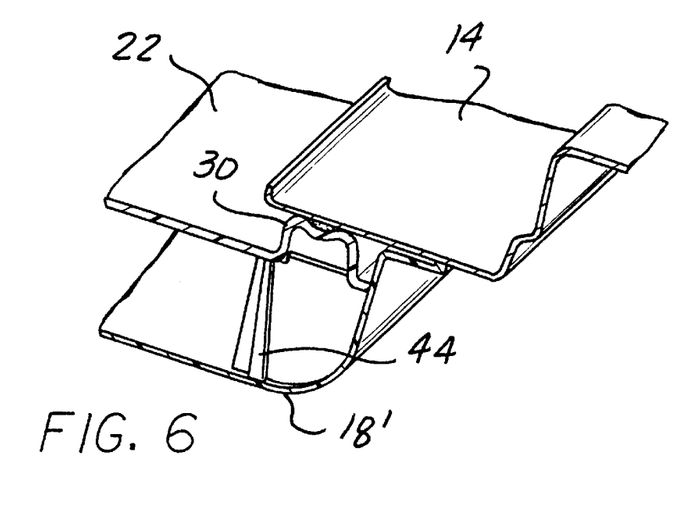
FIG. 6 is a partial, perspective view of an alternate aspect of the door water shield of the present invention.

Other mounting arrangements are also possible. As shown in FIG. 6, certain vehicle door inner panels require a deep draw. Such a condition may provide little or no support for the water shield 22. Thus, an additional rib or surface 44 is formed or mounted on the door inner trim panel 18 to support an edge of the door water shield 22. In this construction, the raised surface 30 is cantilevered from the inner portion of the water shield 22 mounted generally in contact with or close proximity to the door inner trim panel 18'. However, the interference position of the end surface 32 of the raised surface 30 will still create sufficient force to forcibly seal the adhesive or gasket material 26 bead to the door inner panel 14 when the door inner trim panel 18' is itself affixed to the door inner sheet metal panel 14.

Figure 7:
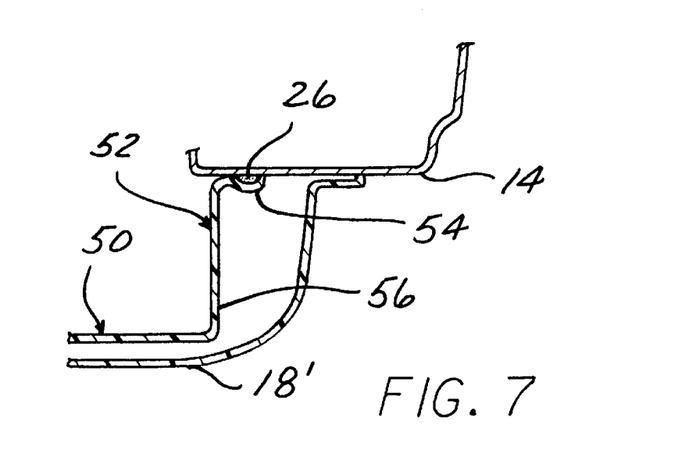
FIG. 7 is a partial, cross sectional view showing another design aspect of the door water shield according to the present invention.

FIG. 7 depicts another aspect of a raised surface on a door water shield 50. In this aspect, the raised surface 52 is in a form of a straight wall 54 connected to the main extent of the water shield 50 by a sidewall 56. The seal material 26 is carried on a straight wall 54. The length of a side wall 56 from the door inner trim panel 18 is selected to place the adhesive bead 26 in a straight wall 54 in an interference condition with the inner door panel 14. This interference causes a deflection in the straight wall 54 as the door inner trim panel 18 is affixed to the door inner panel 14. This deflection creates a sufficient force, which securely attaches and seals the adhesive or gasket material 26 and thereby the entire water shield 50 to the door inner panel 14.

Referring back to FIG. 1, the raised surface may also take an S-shape 60. Unlike the raised inverted U-shaped surface 30 shown in FIGS. 2–5 wherein the outer peripheral edge 31 of the water shield 22 is in contact with the door inner trim panel 18, the entire S-shape surface 60 cantilevered or projects moveably outward from the door inner trim panel 18. The S-shape has a restorative force after initial deflection.

It should be noted that FIG. 1 shows a combination of the inverted U-shaped raised section 30, which extends around the top and two sides of the door inner trim panel 18. The S-shaped surface 60 is generally provided along a deep draw area at the lower extent of the water shield 20. The S-shaped surface 60 provides a consistent deflection force over a longer deflection curve. This allows flexibility in the amount of force exerted by the S-shape section on the seal material 26 due to a longer travel distance to securely attach the adhesive bead 26 to the door inner panel 14.

Figure 8:
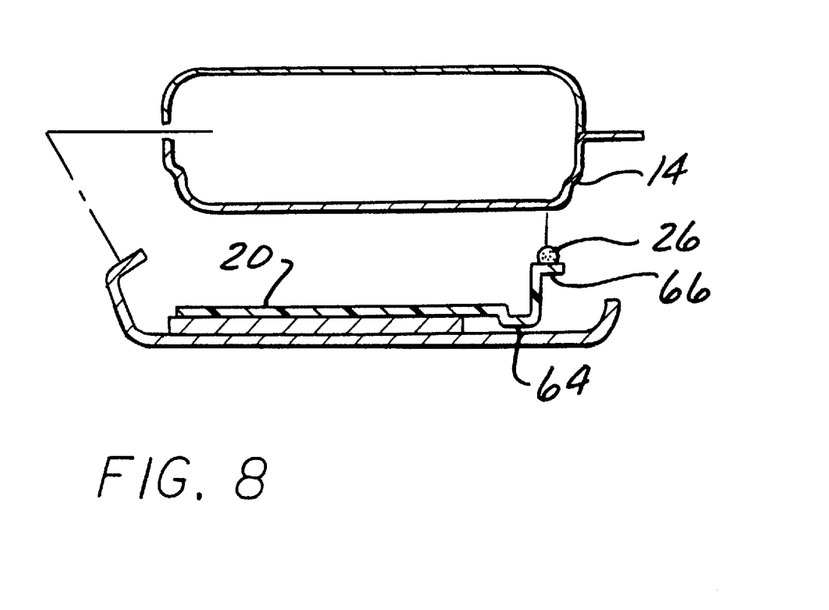
FIG. 8 is a partial, cross sectional view showing another aspect of the door weather shield according to the present invention.

As shown in FIG. 8, the raised surface may also be in the shape of a U-shaped section 64, which terminates in a straight wall 66 carrying the seal material 26. The U-shape section 64 on the water shield 20 provides a deflection force, which rises rapidly on a small deflection. The general stiffness of the water shield 20 would generate required force to securely seal the seal material 26 to the door inner panel 14.

Figure 9:
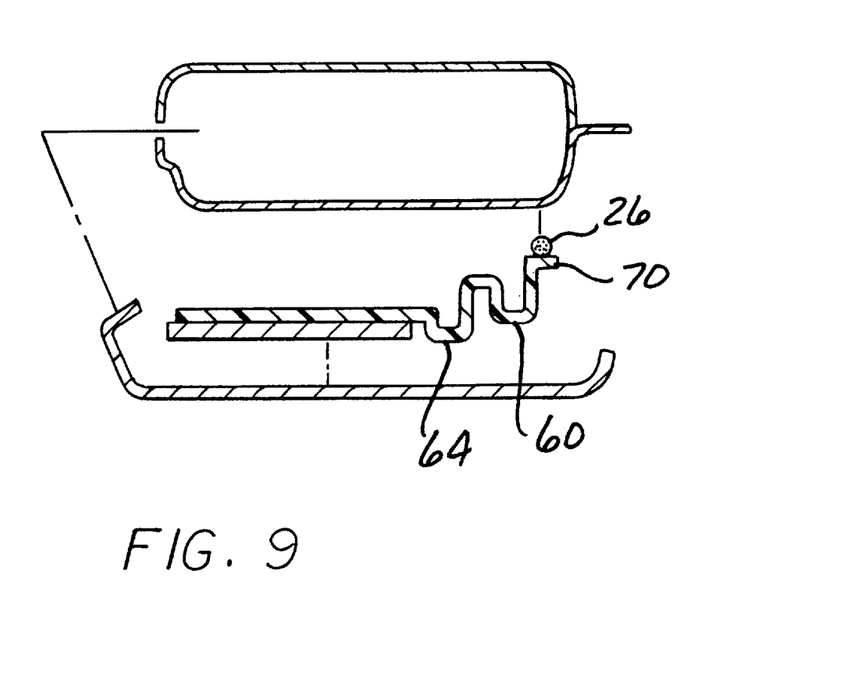
FIG. 9 is a partial, cross sectional view showing another aspect of the door water shield according to the present invention.

FIG. 9 depicts a combination of the U-shaped section 64 with the aspect to the invention shown in FIG. 8 having the S-shaped section 60 of FIG. 1 terminating in a straight wall section 70 carrying the seal material 26. This provides the deflection characteristics of the S-shaped section 60 described above with the rapid rising deflection force on relatively small deflections of the U-shaped section 60 shown in FIG. 8.

Figure 10:
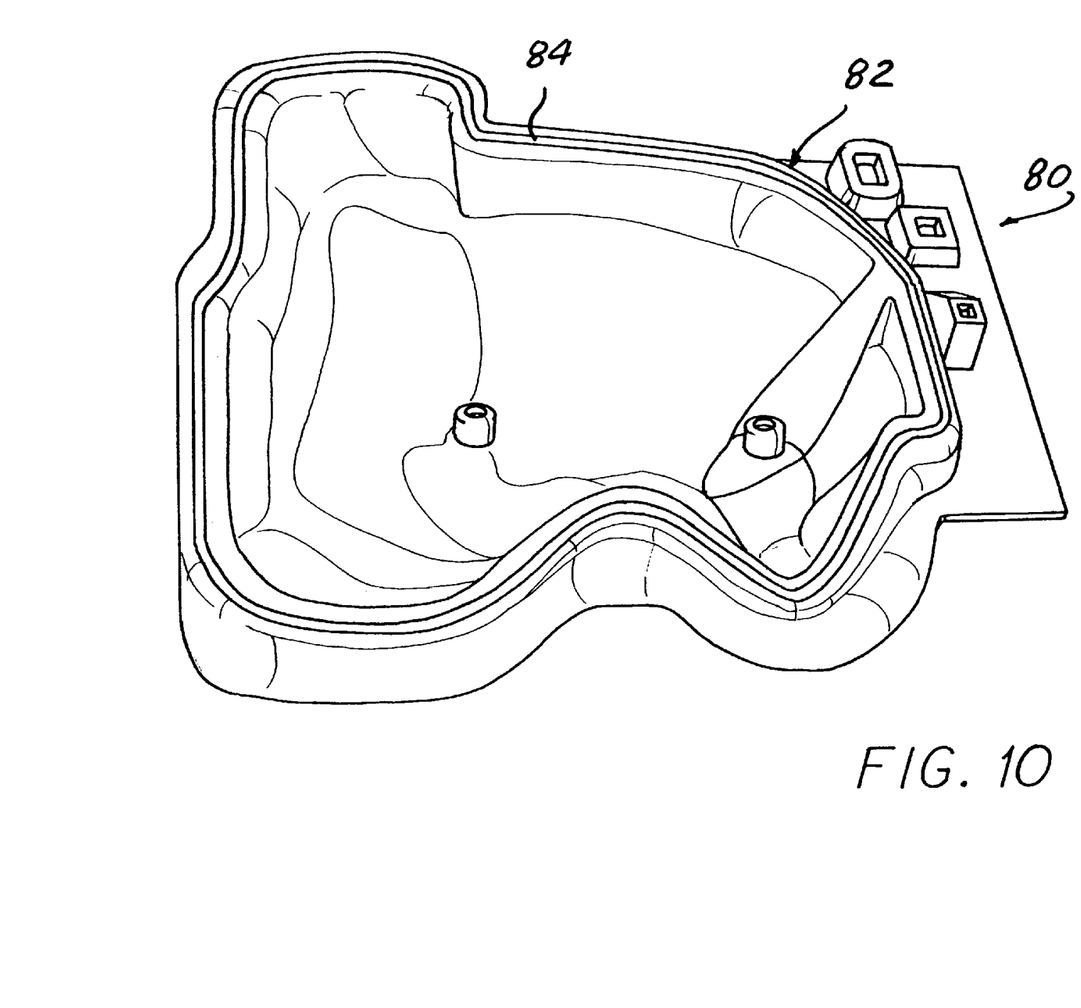
FIG. 10 is a perspective view of another aspect of the present invention.

Yet another aspect of the present invention is shown in FIG. 10 in which a door water shield 80 is depicted as a formed sheet of resilient material. Although the door water shield 80 may take any form depending upon the shape and hardware requirements of a particular door application, in this aspect of the invention, the seal material attachment surface 82 is in the form of a raised sidewall integrally formed as part of the entire sheet. The attachment surface 82 is formed as part of the sheet and not as a planar edge having a raised attachment surface as in the previously described and illustrated aspects of the door water shield according to the present invention. Forming the attachment surface 82 as part of the actual sidewall formation of the door water shield 80 affords design flexibility as an attachment surface separate from the formed surfaces of the door water shield.

As in the previous aspects of the invention, a seal layer, typically in the form of a bead 84 is applied to the peripheral edge of the attachment surface 82 typically continuously about the entire periphery of the attachment surface 82. It will be understood that discontinuities may also be formed in the attachment surface 82 and/or the seal material 84 is required to meet a particular application design.

Regardless, the attachment surface 82 will deflect under attachment pressure when the door water shield 80 is applied to the door inner panel 14 in the same manner as the aspects of the present invention described above. This deflection will generate a sufficient sealing force to firmly affix the sealing material 84 to the door inner panel 14.

In conclusion, there has been disclosed a unique self-sealing door barrier or water shield which creates a seal between the barrier and the door inner sheet metal panel simultaneously with attachment of the door inner trim panel on which the water shield barrier is mounted to the door inner panel without the need for additional pressure application to the seal material on the barrier. The surface on the barrier carrying the seal material may be provided in different cross sections or cantilevered shapes to provide different deflection/force characteristics to suit the needs of many different applications. The self-sealing barrier simplifies the overall assembly of the vehicle door by eliminating the need for separate sealing attachment of the barrier to the door inner sheet metal panel.

What is claimed is:

1. A method of manufacturing a door water shield mountable on an inner door trim panel attachable to a vehicle door inner panel comprising the steps of:

forming a door water shield of a barrier sheet with an attachment surface disposed in interference position with a door inner panel when the door water shield is attached to the door inner panel;

forming the attachment surface as a generally U-shaped section having an end wall spaced from a major extent of the barrier sheet and deformably supported between opposed sidewalls of the U-shaped section;

applying a seal material on the end wall of the attachment surface;

combining the door water shield with an inner door trim panel to create a module; and installing the inner door trim panel module to the door inner panel while simultaneously sealing the door water shield to the door inner panel through interference contact of the end wall of the attachment surface of the door water shield with the door inner panel.

2. The method of claim 1 wherein the step of applying a seal material on the attachment surface further comprises the step of:

forming the adhesive material seal.

3. The method of claim 1 wherein the step of applying the seal material on the attachment surface further comprises the step of:

applying a compressible foam in place gasket material on the attachment surface.

4. A vehicle door water shield manufactured in accordance with the method of claim 1.

5. A method of manufacturing a door water shield mountable on an inner door trim panel attachable to a vehicle door inner panel comprising the steps of:

forming a door water shield with an attachment surface disposed in interference position with a door inner panel when the door water shield is attached to the door inner panel;

applying a seal material on the attachment surface;

forming a cantilevered end on the door water shield, the seal material carried on the cantilevered end;

combining the door water shield with an inner door trim panel to create a module: and installing the inner door trim panel module to the door inner panel while simultaneously sealing the door water shield to the door inner panel through interference contact of the attachment surface of the door water shield with the door inner panel.

6. The method of claim 5 wherein the step of forming the cantilevered end comprises the step of:

forming the cantilevered end in a non-linear shape.

7. The method of claim 6 wherein the step of forming the cantilevered end comprises the step of:

forming the cantilevered end in an S-shape.

8. The method of claim 6 wherein the step of forming the cantilevered end further comprises the step of:

forming the cantilevered end in a U-shape.

9. The method of claim 6 wherein the step of forming the cantilevered end comprises the step of:

forming the cantilevered end with a combination of S and U-shapes.

10. The method of claim 6 wherein the step of forming the cantilevered end comprises:

terminating the cantilevered end in a planar edge spaced from a major extent of the barrier sheet; and applying the seal material on the planar edge.

11. A vehicle door water shield apparatus mountable on an inner door trim panel which is attachable to a vehicle door inner panel, the door water shield comprising:

a barrier sheet;

an attachment surface having a generally U-shaped section having an end wall spaced from a major extent of the barrier sheet and deformably supported between opposed sidewalls of the U-shaped section integrally formed within the barrier sheet adapted to be deflectable under interference engagement with the door inner panel; and a seal material carried on the endwall of the attachment surface for sealing the barrier sheet to a vehicle door inner panel.

12. The door water shield of claim 11 further comprising:

means for mounting the barrier sheet on an inner door trim panel.

13. The door water shield of claim 11 wherein the seal material comprises:

an adhesive material.

14. The door water shield of claim 11 wherein the seal material comprises:

a compressible foam material.

15. A vehicle door water shield apparatus mountable on an inner door trim panel which is attachable to a vehicle door inner panel, the door water shield comprising:

a barrier sheet;

an attachment surface integrally formed within the barrier sheet adapted to be deflectable under interference engagement with the door inner panel; and a seal material carried on the attachment surface for sealing the barrier sheet to a vehicle door inner panel;

the attachment surface including a cantilevered end carried on the barrier sheet, the seal material carried on the cantilevered end.

16. The door water shield of claim 15 wherein:

the cantilevered end is non-linear.

17. The door water shield of claim 15 wherein:

the cantilevered end has an S-shape.

18. The door water shield of claim 15 wherein:

the cantilevered end has a U-shape.

19. The door water shield of claim 15 wherein:

the cantilevered end has a combination of S and U-shapes.

20. The door water shield of claim 15 wherein:

the cantilevered end terminates in a planar edge spaced from a major extent of the barrier sheet, the adhesive material carried on the planar edge.

21. A method of manufacturing a vehicle inner door trim panel and door water shield mountable on a vehicle door formed of joined door inner and outer panels, the method comprising the steps of:

forming an inner door trim panel;

forming a water shield of a barrier sheet;

forming the water shield with an attachment surface disposed in interference position with a door inner panel when the joined water shield and the inner door trim panel are attached to the door inner panel;

forming the attachment surface as one of a generally U-shaped section having an end wall spaced from a major extent of the barrier sheet and deformably supported between opposed sidewalls of the U-shaped section, and a cantilevered end on the barrier sheet;

applying a seal material on the attachment surface for sealing the water shield to the door inner panel;

attaching the water shield to the inner door trim panel; and attaching the joined inner door trim panel and the water shield to the door inner panel and simultaneously deflecting the attachment surface on the water shield to create a deflection force to seal the water shield to the door inner panel through the seal material.

22. A vehicle inner door trim panel and water shield apparatus made in accordance with the method of claim 21.

23. A vehicle inner door trim panel and water shield apparatus mountable on a vehicle door inner panel, the apparatus comprising:

an inner door trim panel attachable to a vehicle door inner panel;

a water shield barrier attached to the inner door trim panel;

an attachment surface having a U-shaped section having an end wall spaced from a major extent of the barrier, integrally formed on the water shield barrier and disposed in an interference position with a vehicle door inner panel when the inner door trim panel and the barrier is mounted on the vehicle inner door panel; and a seal material carried on the end wall of the attachment surface adapted for sealing attachment of the barrier to the door inner panel.

24. A vehicle inner door trim panel and water shield apparatus mountable on a vehicle door inner panel, the apparatus comprising:

an inner door trim panel attachable to a vehicle door inner panel;

a water shield barrier attached to the inner door trim panel;

an attachment surface integrally formed on the water shield barrier disposed in an interference position with a vehicle door inner panel when the inner door trim panel and the barrier is mounted on the of the vehicle inner door panel; and a seal material carried on the attachment surface adapted for sealing attachment of the barrier to the door inner panel; and the attachment surface including a cantilevered end on the barrier, the seal material carried on the cantilevered end.

25. The apparatus of claim 24 wherein:
the cantilevered end is non-linear.

26. The apparatus of claim 24 wherein:
the cantilevered end has an S-shape.

27. The apparatus of claim 24 wherein:
the cantilevered end has a U-shape.

28. The apparatus of claim 24 wherein:
the cantilevered end has a combination of S and U-shapes.

29. The apparatus of claim 24 wherein:
the cantilevered end terminates in a planar edge spaced from a major extent of the barrier, the seal material carried on the planar edge.

30. A method of manufacturing a vehicle door comprising the steps of:

forming the vehicle door with a door inner panel;

providing an inner door trim panel;

forming a barrier;

forming an attachment surface carried on the barrier adapted to be deflectable under interference engagement with the door inner panel;

forming the attachment surface as one of a generally U-shaped section having an end wall spaced from a major extent of the barrier sheet and deformably supported between opposed sidewalls of the U-shaped section, and a cantilevered end on the barrier sheet;

applying a seal material on the attachment surface;

attaching the barrier to the inner door trim panel;

mounting the inner door trim panel to the door inner panel; and simultaneously with the mounting the inner door trim panel on the door inner panel, forcibly deflecting the attachment surface of the barrier by interference with the door inner panel to create a deflection force in the attachment surface which applies a sealing force on the seal material to seal the barrier to the door inner panel.

31. A vehicle door made by the method of claim 30.

32. A vehicle door assembly comprising:

joined door inner and outer metal panels;

an inner door trim panel attachable to the vehicle inner door panel;

a barrier attached to the inner door trim panel;

an attachment surface carried on the barrier adapted to be deflectable under interference engagement with the door inner panel, the attachment surface including one of a generally U-shaped section having an end wall spaced from a major extent of the barrier sheet and deformably supported between opposed sidewalls of the U-shaped section, and a cantilevered end on the barrier sheet; and a seal material carried on the attachment surface.

33. A method of manufacturing a vehicle door having a door inner panel comprising the steps of:

forming a door water shield with an attachment surface disposed in interference position with a door inner panel when the door water shield is attached to the door inner panel;

forming the attachment surface on the door water shield having at least one wall portion supporting a deformable surface;

applying a seal material on the deformable surface;

combining the door water shield with an inner door trim panel to create an inner door trim panel module; and installing the inner door trim panel module to the door inner panel while simultaneously sealing the door water shield to the door inner panel through interference contact caused deformation of the deformable surface of the attachment surface of the door water shield with the door inner panel.

34. A vehicle door assembly including a door inner panel, the assembly comprising:

an inner door trim panel attachable to the vehicle inner door panel;

a door water shield with an attachment surface disposed in interference contact with the door inner panel when the door water shield is attached to the door inner panel;

the attachment surface shield having at least one wall portion supporting a deformable surface;

a seal material carried on the attachment surface;

the door water shield joined to the inner door trim panel to form an inner door trim panel module; and the attachment surface adapted to be deflectable under interference engagement of the door inner panel when the door water shield is attached to the door inner panel.

* * * * *